Farrile S. Young
INVENTOR.

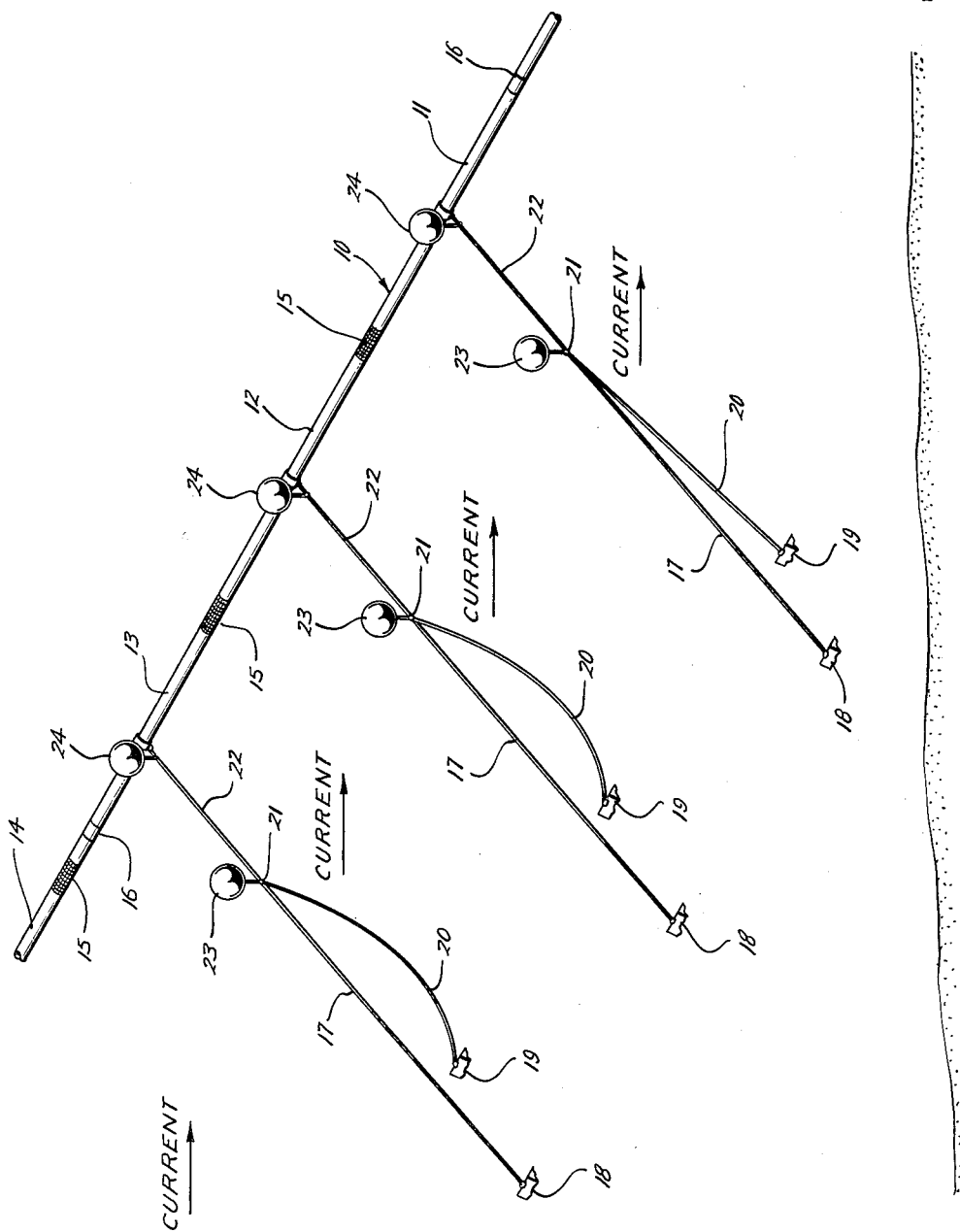

United States Patent Office 3,021,864
Patented Feb. 20, 1962

3,021,864
PIPELINE
Farrile S. Young, Houston, Tex., assignor to Gulf Interstate Oil Company, Houston, Tex., a corporation of Delaware
Filed May 2, 1958, Ser. No. 732,497
4 Claims. (Cl. 137—236)

This invention relates to pipelines and more particularly to pipelines crossing very deep bodies of water.

Pipelines have been laid in shallow water. These lines are usually weighted and rest on bottom. Frequently they are buried in the soil below the body of water. This conventional practice cannot be followed in deep water such as the Yucatan Straits, Mediterranean, etc. because of the many problems encountered in deep water. For instance, the crushing pressure of water at great depth is high. This pressure varies with the contour of the bottom and would require the line to be designed for the greatest depth expected. In the Yucatan Straits this would be in the order of 6,700 ft. At this depth there is approximately 3,000 p.s.i. crushing pressure which would require ⅞ inch wall thickness when using grade B 12-inch pipe with a nominal safety factor of 1.25. Very high stresses would be caused in suspending long lengths of such pipe off of a laying barge to the bottom. Bending forces many times the yield strength of the pipe would be developed. The high bending forces could only be eliminated by utilizing a fleet of crane barges. Keeping these barges effective in the surface currents such as the six mile per hour current in the Yucatan Straits would be a very difficult assignment. Additionally, large bending forces would be developed due to the pipe conforming to the unknown roughness of the bottom. In many cases sharp cliffs are present in deep water which are hard to detect and avoid. Long spans of pipe over the sharp depressions could cause sufficient forces to kink the pipe, with possible rupturing occurring. Another factor to consider in deep water is high oscillating forces near the bottom. These forces place high strains on the pipe especially when rigid pipe spans sections of the bottom and is anchored at each end by silt. In the event of sudden rough water great difficulty would be experienced in releasing and later reclaiming a pipeline. Picking a pipe off of the bottom of 6,700 ft. of water without kinking it would be an expensive time-consuming job, if even possible.

It is an object of this invention to provide a pipeline for crossing deep bodies of water.

Another object is to provide a pipeline which is below the level of the surface but which is above bottom where uncontrollable scouring, spans, sharp bends and high oscillating forces can occur.

Another object is to provide a pipeline for deep water which is maintained at a uniform controlled depth that will fit the crushing strength of the pipe wall.

Another object is to provide a pipeline having flexible connections at spaced points to allow the pipeline to move with the variable currents which are encountered and keep the stress level of the pipe at a relatively low point.

Another object is to provide a pipeline suspended at an intermediate level in a body of water in which the stress level of the pipe due to the means for anchoring the pipe in position is at a relatively low value.

Another object is to provide a pipeline for suspending at an intermediate level in a body of water which is compartmented to prevent the line from sinking to bottom should a break occur.

Another object is to provide a marine pipeline in which each section may be pressured and tested before it is lowered into final position.

Another object is to provide a pipeline which is buoyant and which will be maintained between a predetermined high and low level by a novel anchoring system.

Another object is to provide a pipeline for marine service which is easy to locate and raise after it is in service, should the occasion arise.

Another object is to provide a pipeline for marine service in which a thinner wall pipe can be used for a particular service as compared to a pipe designed for laying on bottom.

In accordance with this invention the pipeline is designed with buoyancy. It is anchored in place with a plurality of anchors which are upstream of the pipe a considerable distance and connected to the pipe by cable. The normal current will cause the pipe to sink to a predetermined level. A second anchoring system is provided which limits the level to which the pipeline may rise in the event current flow reduces or ceases altogether.

Flexible connections are provided at spaced points to permit the pipeline to conform to the force conditions to which it is subjected.

Check valves positioned at spaced points permit the testing of sections of the line as it is being laid and prevent flooding of the entire line in the event of a leak after the line has been put in service.

Referring now to the drawings wherein there is shown an illustrative embodiment of this invention and wherein like reference numerals indicate like parts:

FIGURE 3 is a perspective view of the pipeline and anchoring system.

Figure 1:
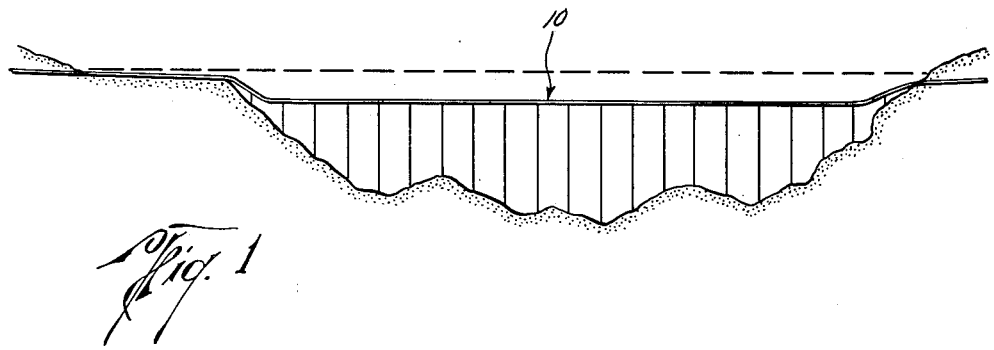
FIGURE 1 is a cross-sectional view illustrating a pipeline suspended at an intermediate level and crossing a deep body of water.

The pipeline indicated generally at 10 is made up of a plurality of sections, some of which are shown at 11, 12, 13 and 14. Each section of the pipeline is fabricated in the conventional manner by welding together short lengths of pipe.

At periodic intervals the sections of the pipeline 10 are connected together by flexible connectors 15. These connectors permit the sections of pipe to bend relative to each other and move with the variable currents which are encountered. The flexibility provided by connectors 15 keeps the stress level in the relatively rigid pipe at safe levels. Tht flexible connections permit the laying or taking up of the pipe without over-bending and stressing the metallic rigid pipe sections and permit the handling of long lengths at great depths. The number of flexible connectors 15 employed will preferably be kept to a minimum, but as many as necessary to give a line the desired flexibility may be employed.

The pipeline 10 is compartmented by a plurality of check valves 16 which control flow through the pipeline and are preferably spaced along its entire length. These check valves permit flow from the source of the fluid to be pumped to its destination or terminal. The check valves are preferably positioned every half mile or so to permit pressure testing of half-mile sections of pipe and to provide compartments of approximately one-half mile length to prevent flooding of the entire pipeline if a break occurs. When in service the gas pressure in the line will be much greater than the hydrostatic pressure exerted by the water surrounding the line. Thus if a break occurs, the downstream check valve will be immediately closed by the high pressure in the line downstream of the valve. The terminal outlet from the line would of course be closed upon a break occurring to trap this high pressure within the line and prevent flooding of the line downstream of the break. The line would be closed off at its upstream end to permit gas pressure within the upstream section of the line to bleed down. As soon as this pressure is reduced below the hydrostatic pressure of the surrounding water, the upstream valve adjacent a break would close. Thus, only the section of pipe between two adjacent check valves would flood, and the buoyancy of the remainder of the pipe would prevent the entire pipeline from sinking. Of course the buoyant pipeline would tend to support the section which had filled with water until the leaky section could be repaired.

The pipeline is anchored in position with a system of anchors which maintain the pipeline between a predetermined high and low level beneath the surface of the water. In straits and narrow seas for which this pipeline is eminently suited, a rather constant current is usually present. In designing the pipeline, this current is taken into consideration. The buoyancy of the pipeline and the angle which the primary anchoring cable 17 makes with the bottom are designed to maintain the pipeline at a predetermined depth. Because the currents generally decrease with depth, it is desirable to have the pipe as low as possible so as to have minimum horizontal forces which result in smaller anchors. It is also desirable to have the pipe as high as possible to reduce the necessary crushing strength of the pipe and permit use of a thinner wall pipe. Thin wall pipe is less expensive and gives higher buoyancy. The high buoyancy is used to minimize the length of the primary anchor lines. Thus, a compromise depth must be selected. For instance, in the Yucatan Straits which are some 6,500 ft. in depth, a compromise pipe depth of 1,500 ft. may be selected. Current at this depth is normally 1.12 miles per hour. The tangent of the angle which the primary anchoring line would assume is the buoyancy forces of the pipeline divided by the current forces on the pipeline. Given this angle and the height of the pipeline, the length of the primary anchoring line may be calculated with simple trigonometry. For instance if we assume a pipeline having approximately 14 lbs. per ft. of buoyancy submerged at 1,500 ft. in the Yucatan Straights, the tangent of 14 divided by current forces (which with 12 inch pipe would result in 27.5 lbs. per ft.) would be 27 degrees. By simple trigonometry the length of the primary anchor line would be approximately 11,000 ft.

A plurality of primary anchor lines are indicated at 17 and extend between the pipeline 10 and a plurality of anchors 18 positioned upstream from the pipeline. It will be understood that the lines 17 and anchors 18 will hold the pipeline 10 submerged at approximately 1,500 ft. due to the force of the 1.12 mile per hour current. If the current increases above this value, the pipeline would descend. Upon decrease in current, the pipeline will ascend. Preferably the system should be designed with the maximum current conditions in mind so that the wall thickness of the pipe selected will be sufficient to withstand the crushing pressure at the design depth for maximum current.

Figure 2:
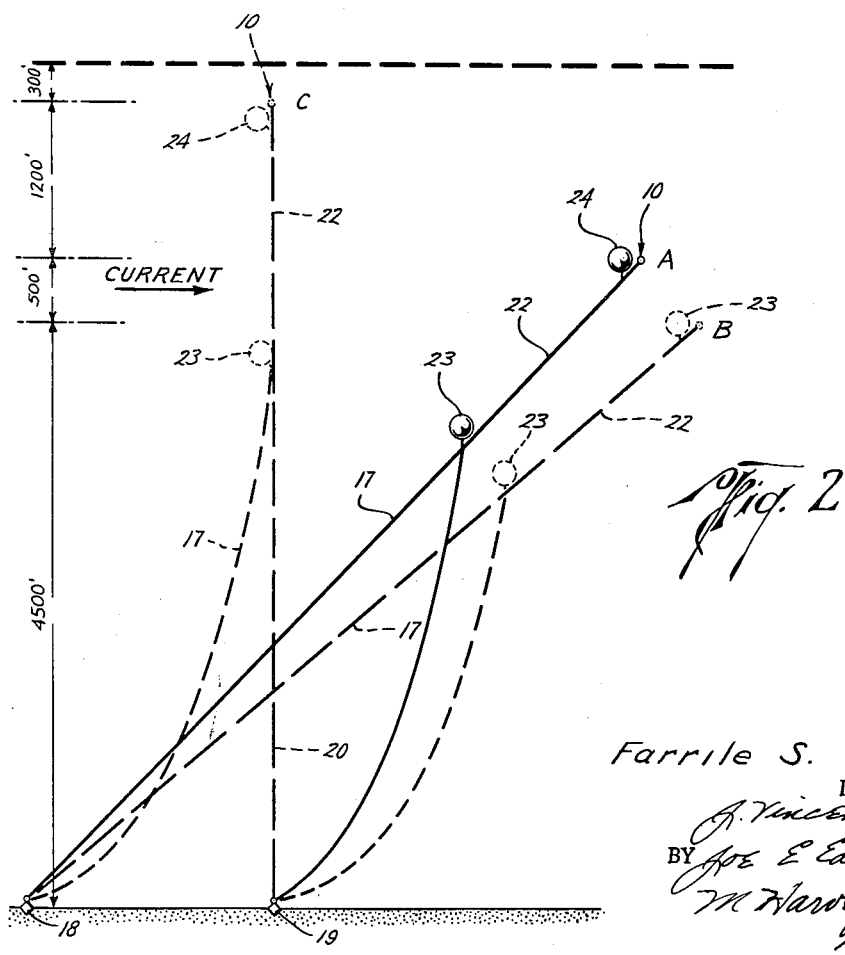
FIGURE 2 is a sectional view taken at right angles to FIGURE 1 and showing three different positions of the pipeline under three different current conditions.

It will be noted that the length of the anchor line 17 is substantially greater than the depth of the water and, therefore, under conditions of no current flow or substantially no current flow, the pipeline could rise to the surface where it would be a menace to navigation. To establish an upper limit for the pipeline, a secondary anchoring system is provided. This system includes the anchors 19 to which the secondary anchoring cables 20 at attached. These cables 20 limit the upward rise of the pipe to some preselected value, such as 300 ft. below the surface, as best shown in FIGURE 2. For this purpose the effective length of the cable between the pipeline and anchors 19 should be approximately 300 ft. less than the depth of the water.

In order to economize on cables, the cables are preferably high-yield, tapered, galvanized cables so as to reduce both their weight and cost. Cables 17 and 20 extend between the respective anchors 18 and 19 and a common point 21 at which they are joined together. A single cable 22 extends from this point of joinder to the pipeline 10.

In order that the lines 20 be as short as possible, the point 21 is selected at maximum distance from the pipeline 10. For instance with the cable 17 extending at an angle of 27 degrees, the point 21 could be approximately 2,200 ft. from the pipeline and cable 20 would have a length of approximately 4,000 ft. A further advantage of this system is that a single line to the pipe cannot set up opposing stresses. Where two cables are attached to the pipe at or close to each other, opposing stresses are possible.

The dead weight of cables 17, 20 and 22 will be considerable and if supported by the pipe would cause it to assume a configuration resembling a succession of arcs. This is undesirable, as stresses in the pipe should be maintained at a minimum. Therefore, it is preferred to provide the cables with a system of floats which will support the dead weight of the cables. Such a system of floats may be provided by floats 23 attached to points 21 and floats 24 attached to cables 22 immediately adjacent the pipeline 10.

Laying procedure would preferably be to start from the terminal end and build toward the source so that each section of pipe could be tested by compression on the lay barge. In performing these tests the several check valves 16 would provide test compartments as they would close against flow away from the terminal end of the pipe.

As each section of pipe is laid, a pair of lay barges would drop each pair of anchors 18 and 19 at points spaced apart by the approximate distances which these anchors should assume with each other. However, it will be apparent that forces to which the pipeline will be subjected and other factors, such as bottom conditions, difficulty in positioning the vessels, etc., will result in dragging of some of the anchors until all of the primary anchors 18 are effective to hold the pipeline in position. Of course as the anchors 18 drag, they will move closer to anchors 19, and these anchors will assist in holding the pipeline 10 in positon. This condition is shown by one of the anchoring systems of FIGURE 3. This is of particular advantage in the event of unusual conditions which might tend to drag one or more of anchors 18.

After the line has been laid, it should assume the position shown at A of FIGURE 2. However, if the normal currents reduce, the line will ascend from the position A and upon a substantially no current condition existing, the pipeline will move to position C. Upon the normal currents increasing, the pipeline will descend toward position B. Position B represents the depth to which the pipe will descend with maximum current conditions. It is of course apparent from FIGURE 2 that the primary anchoring cable 17 is controlling the position of the pipeline at positions A and B, and that the secondary anchoring cable 20 is controlling the position of the pipeline at position C.

The depths given in FIGURE 2 are suggested for a body of water 6,500 ft. deep.

From the above it will be seen that the objects of this invention have been attained. There has been provided a system of suspending pipe at an intermediate level in deep water, and the pipe has been protected against complete submergence even in the case of leaks. As compared to the pipe resting on bottom, a much thinner wall pipe may be used. It will be appreciated that while in use, the pipe will always be under at least the pressure exerted by 300 ft. of water and, therefore, a greater internal pressure can be tolerated with a given size pipe than would be possible at the surface.

The pipeline illustrated is designed to carry gas and, therefore, the gas-filled pipe provides the necessary buoyancy. If the line is to transmit liquid, auxiliary means would have to be provided to render the pipeline negatively buoyant.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A pipeline suspended under water comprising, a plurality of sections of metallic pipe, a plurality of flexible connectors connecting the pipe sections into a continuous pipeline, said pipeline being puoyant when containing gas, primary anchoring means provided by a plurality of primary cables secured to the pipeline at spaced points and to a plurality of primary anchors resting on bottom upstream of the pipeline, said primary cables being of greater length than the water depth, the length of the primary cables and the degree of buoyancy of the pipeline being selected relative to the maximum current conditions expected to provide a predetermined depth beyond which the pipeline will not descend, and secondary anchoring means provided by a plurality of secondary cables secured to the pipe at spaced points and to secondary anchors resting on bottom, said secondary cables being of lesser length than the depth of the water to limit ascending of the pipeline to a predetermined depth as the force of the current reduces.

2. The pipeline of claim 1 wherein means are provided for supporting the dead weight of both primary and secondary cables to prevent this weight from being imposed on the pipeline.

3. The pipeline of claim 1 wherein a plurality of check valves are positioned at spaced intervals in said pipeline to permit testing of sections of pipe as they are assembled and to compartmentize the line in the event of a leak to prevent flooding of the entire pipeline.

4. A pipeline suspended under water comprising, a plurality of sections of metallic pipe, a plurality of flexible connectors connecting the pipe sections into a continuous pipeline, said pipeline being buoyant when containing gas, and means for anchoring the pipeline in position and maintaining the pipeline below a predetermined depth while permitting the pipeline to descend between said depth and a second predetermined depth upon an increase in speed of water currents including primary and secondary cables and anchors, said primary and secondary cables provided by separate cables commencing at the respective anchors and extending to points of juncture and by common cables extending from the points of juncture to the pipeline.

References Cited in the file of this patent

UNITED STATES PATENTS

| 486,986 | Schinke | Nov. 29, 1892 |
| 1,956,010 | Diescher | Apr. 24, 1934 |

FOREIGN PATENTS

| 2,141 | Great Britain | Aug. 21, 1866 |
| 80,240 | Denmark | Nov. 21, 1955 |